Nov. 22, 1949　　　　　　　　G. E. HENNING　　　　　　2,488,595
APPARATUS FOR PLASTICIZING AND STRAINING
　　　　　　　　　　　　PLASTIC MATERIAL
Filed Aug. 30, 1946　　　　　　　　　　　　　　　2 Sheets-Sheet 1

INVENTOR
G.E. HENNING
BY	[signature]
	ATTORNEY

Nov. 22, 1949  G. E. HENNING  2,488,595
APPARATUS FOR PLASTICIZING AND STRAINING
PLASTIC MATERIAL
Filed Aug. 30, 1946  2 Sheets-Sheet 2

INVENTOR
G.E. HENNING
BY
ATTORNEY

Patented Nov. 22, 1949

2,488,595

UNITED STATES PATENT OFFICE 2,488,595

APPARATUS FOR PLASTICIZING AND STRAINING PLASTIC MATERIAL

George E. Henning, Baltimore, Md., assignor to Western Electric Company, Incorporated, New York, N. Y., a corporation of New York Application August 30, 1946, Serial No. 693,858

4 Claims. (Cl. 18—12)

This invention relates to apparatus for plasticizing and straining plastic material.

In the manufacture of products from plastic material, such as a vulcanizable compound including rubber or a synthetic rubber-like material, it is often advantageous to plasticize the material and to strain the material while in the extruder. In the past, no strainers have been known for straining from the material elongated, needle-like particles, which might produce faults if the material is used for electrical insulation.

An object of the invention is to provide new and improved apparatus for plasticizing and straining plastic material.

An apparatus illustrative of the invention includes a conduit and means for forcing plastic material through the conduit. A pair of breaker plates having passages extending therethrough are positioned near the exit end of the conduit, with the passages in one of the plates staggered with respect to the passages in the other plate, and a frusto-conical strainer is positioned in the exit of the conduit. The strainer includes a frusto-conical backing plate having relieved passages therein, a backing screen mounted on the backing plate, and a straining screen positioned on the backing screen. The material is forced through the extrusion passage in one direction, and is forced through the strainer in directions substantially perpendicular to the first-mentioned direction. As a result, elongated needle-like fault-producing particles are pressed laterally against the strainer and are strained thereby. Globular or other shaped particles likewise are removed by the strainer.

A complete understanding of the invention may be obtained from the following detailed description of an apparatus forming a specific embodiment thereof, when read in conjunction with the appended drawings, in which.

Figure 1:
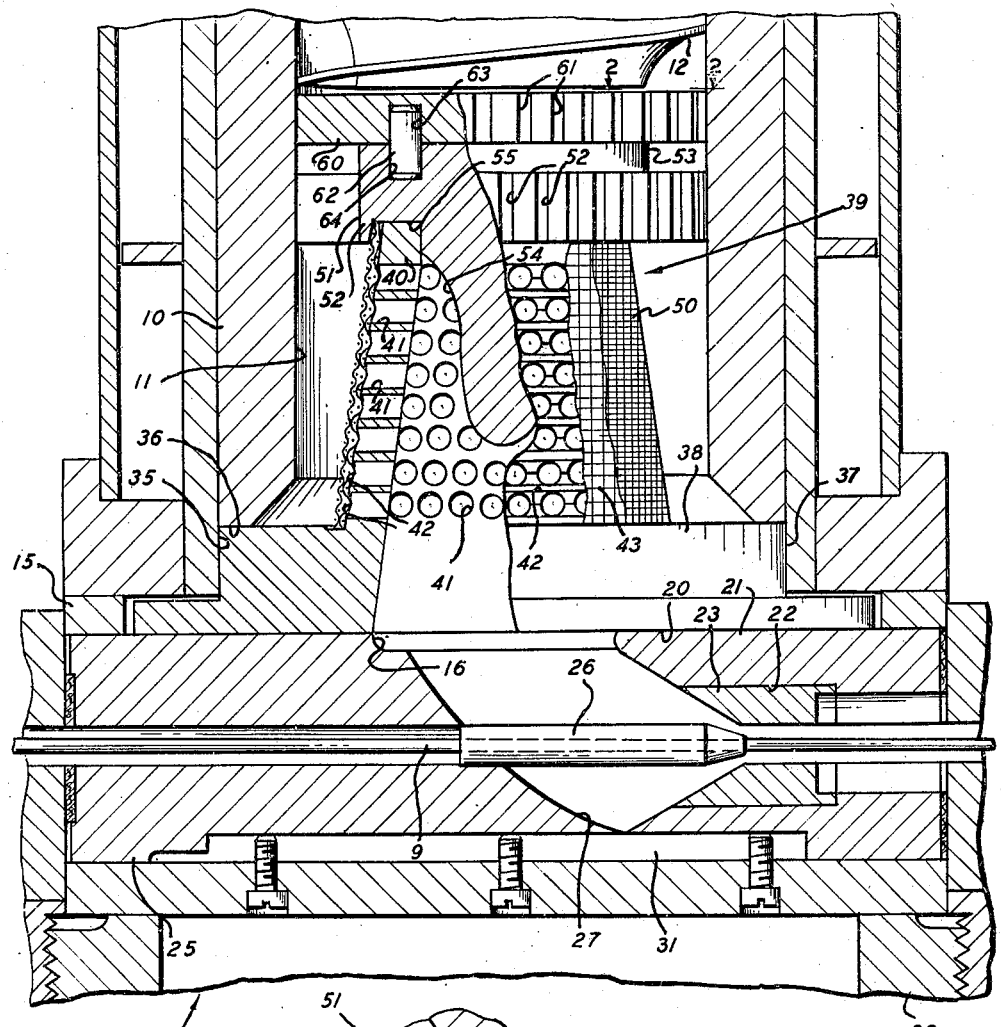
Fig. 1 is a fragmentary, horizontal section of an apparatus forming one embodiment of the invention.
Figure 2:
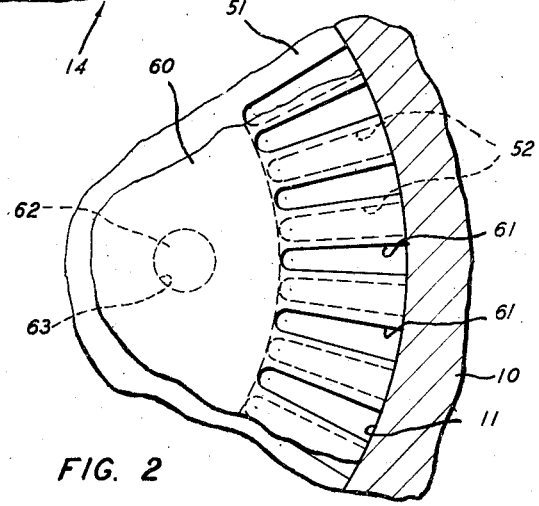
Fig. 2 is an enlarged, fragmentary, vertical section taken along line 2—2 of Fig. 1.
Figure 3:
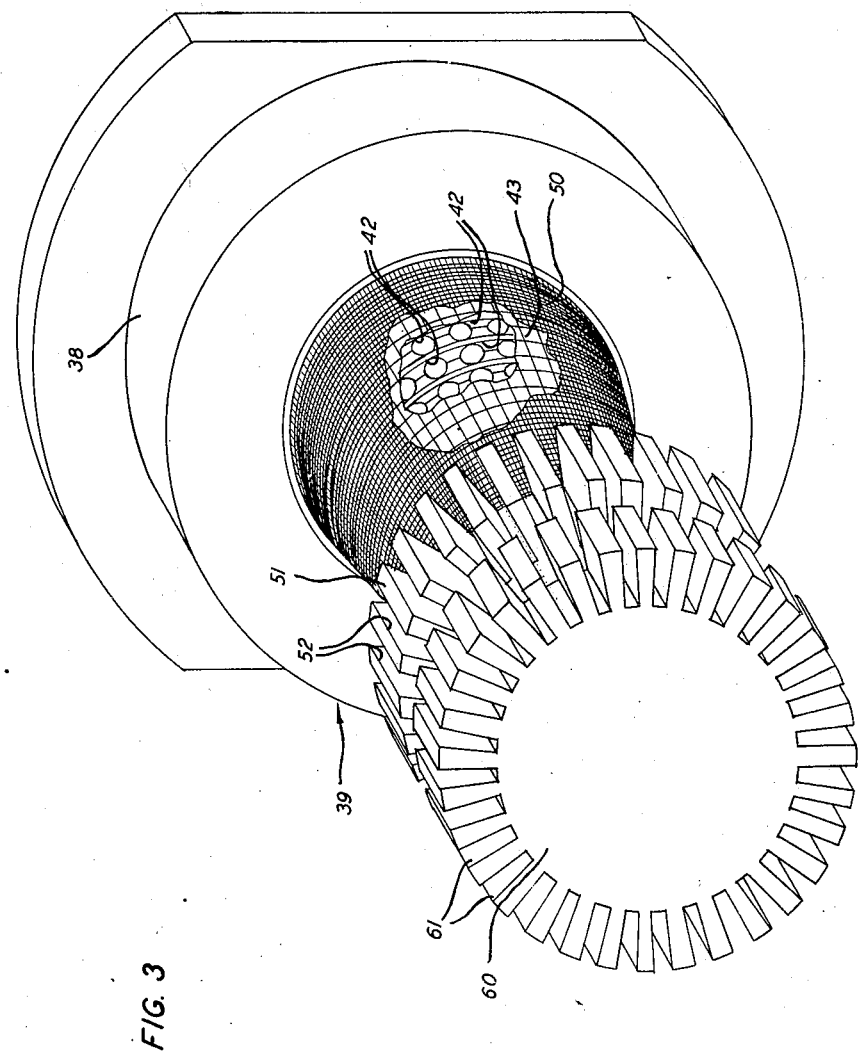
Fig. 3 is an enlarged perspective view of a portion of the apparatus.

Referring now in detail to the drawings, there is shown in Fig. 1 an extruder, which is designed to apply a covering of plastic material, such as a vulcanizable compound including rubber or a synthetic rubber-like material, on a filamentary conductor 9, which may be bare or covered with a textile or plastic covering. The extruder includes an extrusion cylinder 10 having a cylindrical extrusion bore 11 formed therein, in which bore an elongated stock screw 12 is rotatably mounted. The stock screw is rotated by suitable driving means, such as an electric motor and a gear train (not shown) to force the plastic material through an extruding head 14 under high pressure.

The extruding head 14 includes a body member 15 having a tapered opening 16, which forms a continuation of the extrusion bore 11 and communicates with a bore 20 formed in the extruding head transversely of the tapered opening 16. An annular die holder 21 positioned in the exit end of the bore 20 has a counterbore 22 formed therein in which a forming die 23 is mounted.

The conductor 9 is advanced toward the right, as viewed in Fig. 1, by suitable core-advancing means, such as a capstan (not shown), through a core tube holder 25 and a core tube 26, which is held by the core tube holder. The core tube holder is provided with an inclined concave surface 27 for directing the plastic material toward the die 23, and an aligning plate 31 maintains the die holder 21 and the core tube 25, and thereby the die 23 and the core tube 26, centered relative to each other in the bore 20. A retaining nut 32 holds these elements in place in the extruding head 14.

The extrusion cylinder 10 is provided with a counterbore 35 and an annular shoulder 36. A cylindrical boss 37 of a support 38 of a working and straining device 39 fits into the counterbore 35. The support 38 includes a hollow, frusto-conical backing plate 40 secured integrally to the boss. The backing plate 40 is provided with a plurality of passages 41—41 arranged in rows therearound, and has a plurality of ring-like grooves 42—42 formed therein, which ring-like grooves 42—42 are in communication with the passages 41—41. A heavy backing screen 43, which is frusto-conical in shape, fits closely over the backing plate 40 and is supported thereby. The backing screen 43 should have a mesh of size between 16 and 10. A fine straining screen 50, which is frusto-conical in shape, fits over the coarse backing screen 43, and the size of the mesh of the straining screen should be between about 50 and about 180.

A breaker plate 51 having a plurality of radially directed slots 52—52 formed therein is provided with a boss 53 projecting toward the stock screw 12 and a tapered guide 54 extending into the upper end of the backing plate 40, as viewed in Fig. 1. The breaker plate 51 also is provided with an annular socket 55 for receiving the upper ends of the screens 43 and 50 and the backing plate 40, which fit closely therein. The boss 37 of the support 38 has an annular socket 56 for receiving the lower ends of the screens 43 and 50 in close-fitting engagement.

A second breaker plate 60 having a plurality of radially extending slots 61—61 is oriented with respect to the breaker plate 51 by dowels, of which a dowel 62 is shown. The dowels 62—62 fit into bores, of which a bore 63 is shown, formed in the breaker plate 60, and bores, of which a bore 64 is shown, formed in the breaker plate 51. The breaker plate 60 is held by the dowels 62—62 in a position in which the slots 61—61 therein are staggered with respect to the slots 52—52 formed in the breaker plate 51, so that streams of plastic material flowing through the slots 61—61 divide to flow through the slots 52—52, whereby the material is plasticized as it flows past the two breaker plates, which in effect are staggered combs.

In the operation of the extruder described hereinabove, the elongated stock screw 12 is rotated and forces the plastic material through the extrusion bore 11 formed in the extrusion cylinder 10 in the direction of the arrows in Fig. 1. The stock screw works the material as it advances the material through the extrusion bore, which working plasticizes the material somewhat. The material is forced from the stock screw to the breaker plate 60 in directions generally parallel to the axis of the extrusion bore 11 with any needle-like fault-producing particles therein travelling substantially endwise therewith as they are carried by the material. The material flows through the slots 61—61 in the breaker plate 60, and then flows through the slots 52—52 in the breaker plate 51. Since the slots 52—52 are staggered with respect to the slots 61—61 and the slots 51—51 and 61—61 are small in cross-section relative to that of the extrusion bore 11, the material must flow through narrow tortuous paths in flowing past the breaker plates 51 and 60 and is thoroughly plasticized in so doing.

After the plastic material is forced through the slots 52—52 in the breaker plate 51, it flows seriatim through the straining screen 50, the backing screen 43 and the passages 41—41 in the backing plate 40. The directions of flow of the material change sharply as the material approaches the straining screen 50 and then are substantially radial with respect to the strainer so that the needle-like particles in the material are moved substantially laterally to the strainer. The screen 50 catches the needle-like particles when they are moved laterally thereagainst, which it might not always do so if the needle-like particles were moved endwise to it.

Hence, the straining screen 50 strains out all oversized particles, including needle-like particles, in the material being forced therethrough and the backing screen 43 supports the fine straining screen 50. The backing plate 40 serves to support the heavy backing screen 43, and the annular grooves 42—42, which are in communication with the passages 41—41, provide channels of flow to the passages 41—41, whereby the effective straining area of the screen 50 is larger than it would be if the grooves 42—42 were not provided. As a result, the extruder may be operated for long periods of time without cleaning the straining screen 50 thereof.

Also, the frusto-conical shape of the straining screens 43 and 50 and the backing plate 40 provide a very large effective straining area of the screen 50. Hence, relatively large proportions of the straining screen 50 may be clogged by oversized particles strained from the plastic material, and still leave sufficient unclogged areas of the straining screen 50 to permit ample material to flow through the straining screen. In addition, the straining surface is substantially parallel to the main directions of flow of the material in the extrusion bore 11. The material, after it has passed through the working and straining device 39, is directed by the guide 54 toward the tapered opening 16 and flows through the die 23, which forms the material into a covering over the conductor 9, which is advanced continuously toward the right, as viewed in Fig. 1.

The working and straining device 39 serves to effectively plasticize and strain the material being extruded without plasticizing and straining operations prior to the insertion of the material into the extruder. The device 39 is compact but is very effective and permits ample flow of the material for long operating runs without stopping the extruder to clean or replace the straining screen 50. Furthermore, the device separates slim, elongated particles from the material as well as globular oversized particles.

What is claimed is:

1. An apparatus for plasticizing and straining plastic material, which comprises a conduit, a stock screw rotatably mounted in the conduit for forcing plastic material through the conduit, a breaker plate positioned transversely in the conduit and having a plurality of passages therein, a second breaker plate positioned transversely in the conduit and having a plurality of passages, means for mounting the breaker plates in positions in which the passages in one of the breaker plates are offset with respect to the passages in the other and for spacing the breaker plates, a frusto-conical backing plate having a plurality of passages therein and fitting against one of the breaker plates, said backing plate being mounted transversely in the conduit, said backing plate being relieved adjacent to the passages therein for expediting flow of material therethrough, and a frusto-conical screen supported by the backing plate for straining oversized particles from the plastic material.

2. In a continuous extrusion apparatus including an extrusion cylinder having an extrusion bore therein, an extrusion head and means for forcing plastic material through the extrusion bore to the extrusion head, a working and straining device positioned between the extrusion cylinder and the extruding head comprising a plurality of combs for directing the plastic material in the exit end of the extrusion bore in small streams along tortuous paths to work the plastic material, and a frusto-conical strainer positioned between the combs and the extrusion head in axial alignment with the extrusion bore in the cylinder for straining oversized particles from the plastic material as the material is forced toward the extruding head.

3. In a continuous extrusion apparatus including an extrusion cylinder having an extrusion bore therein, an extruding head having a passage in communication with the exit end of the extrusion bore and means for forcing plastic material through the extrusion bore into the extrusion passage in the extruding head to cover a conductor being advanced through the extruding head, a working and straining device for separating the extrusion bore in the extrusion cylinder from the extrusion passage in the extruding head comprising a pair of breaker plates having a plurality of radially extending slots formed therein, means for mounting the breaker plates in positions relative to each other in which the slots in one of the plates are staggered with respect to the slots in the other plate, one of the said breaker plates being provided with a socket and having a tapered guide, a frusto-conical shell having an end designed to fit into said socket and to receive said guide, said shell being provided with a plurality of passages therein formed in annular rows and also being provided with a plurality of annular grooves formed in the outer portion thereof over the annular rows of passages, and a frusto-conical screen positioned over the frusto-conical shell for straining oversized particles from plastic material being forced from the extruding bore to the extrusion passage.

4. In a continuous extrusion apparatus including an extrusion cylinder having an extrusion bore therein provided with an exit end, said extrusion cylinder having a counterbore at the exit end of the extrusion bore, an extruding head having a passage in communication with the exit end of the extrusion bore and means for forcing plastic material through the extrusion bore into the extrusion passage in the extruding head to cover a conductor being advanced through the extruding head, a working and straining device for separating the extrusion bore in the extrusion cylinder from the extrusion passage in the extruding head comprising a pair of breaker plates having a plurality of radially extending slots formed therein, means for mounting the breaker plates in positions relative to each other in which the slots in one of the plates are staggered with respect to the slots in the other plate, one of the said breaker plates being provided with a socket and a tapered guide, a support provided with a frusto-conical shell and a boss for fitting into the counterbore in the extrusion cylinder, said shell having an end designed to fit into said socket, and serving to receive the guide, said shell also being provided with a plurality of passages therein formed in annular rows and having a plurality of annular grooves formed in the outer portion thereof over the annular rows of passages, and a frusto-conical screen positioned over the frusto-conical shell for straining oversized particles from plastic material being forced from the extruding bore to the extrusion passage.

GEORGE E. HENNING.

REFERENCES CITED

The following references are of record in the file of this patent:

UNITED STATES PATENTS

| Number | Name | Date |
| --- | --- | --- |
| 1,595,470 | Johnson | Aug. 10, 1926 |
| 1,912,374 | Johnson | June 6, 1933 |
| 2,242,364 | Montanau | May 20, 1941 |
| 2,286,405 | Gordon | June 16, 1942 |
| 2,360,984 | Schmitz | Oct. 24, 1944 |

FOREIGN PATENTS

| Number | Country | Date |
| --- | --- | --- |
| 269,761 | Great Britain | Apr. 28, 1927 |